US012651485B2

(12) United States Patent
Palakonda et al.

(10) Patent No.: US 12,651,485 B2
(45) Date of Patent: Jun. 9, 2026

(54) SECURE PERSONAL INFORMATION EXCHANGE OVER C-V2X

(71) Applicant: FORD GLOBAL TECHNOLOGIES, LLC, Dearborn, MI (US)

(72) Inventors: Sathyanaraya Chary Palakonda, Novi, MI (US); Krishna Bandi, Farmington Hills, MI (US); Allen R. Murray, Lake Orion, MI (US); Ivan Vukovic, Birmingham, MI (US); Syed Amaar Ahmad, Canton, MI (US); Jovan Milivoje Zagajac, Ann Arbor, MI (US)

(73) Assignee: FORD GLOBAL TECHNOLOGIES, LLC, Dearborn, MI (US)

( * ) Notice: Subject to any disclaimer, the term of this patent is extended or adjusted under 35 U.S.C. 154(b) by 862 days.

(21) Appl. No.: 17/006,066

(22) Filed: Aug. 28, 2020

(65) Prior Publication Data

US 2022/0068041 A1     Mar. 3, 2022

(51) Int. Cl.
| | |
|---|---|
| *H04L 9/30* | (2006.01) |
| *G07B 15/06* | (2011.01) |
| *H04W 12/02* | (2009.01) |
| *H04W 12/037* | (2021.01) |
| *H04W 12/088* | (2021.01) |

(52) U.S. Cl.
CPC .............. G07B 15/063 (2013.01); H04L 9/30 (2013.01); H04W 12/02 (2013.01); H04W 12/037 (2021.01); H04W 12/088 (2021.01); G06Q 2220/10 (2013.01)

(58) Field of Classification Search
CPC . G06Q 20/308; G06Q 20/3829; H04W 12/00; H04W 4/46
See application file for complete search history.

(56) References Cited

U.S. PATENT DOCUMENTS

| | | | | |
|---|---|---|---|---|
| 7,541,912 | B2 | 6/2009 | Beier | |
| 9,365,188 | B1 * | 6/2016 | Penilla | G07C 9/00309 |
| 10,614,457 | B2 | 4/2020 | Carrott | |
| 2012/0265583 | A1 * | 10/2012 | Namdar | G07B 15/063 |
| | | | | 705/13 |
| 2016/0189146 | A1 * | 6/2016 | Cattone | G06Q 20/3829 |
| | | | | 398/128 |
| 2018/0261018 | A1 * | 9/2018 | Reinold | G07B 15/063 |
| 2019/0340842 | A1 * | 11/2019 | Nakayama | G07B 15/063 |

(Continued)

*Primary Examiner* — Patrick Mcatee
*Assistant Examiner* — Sima Asgari
(74) *Attorney, Agent, or Firm* — Joseph Zane; BROOKS KUSHMAN P.C.

(57) ABSTRACT

A toll advertisement message (TAM) broadcast from a roadside unit of a roadway is received. The TAM may include a public key of a toll charger cloud. Responsive to receipt of the TAM, a tolling usage message (TUM) is sent. The TUM may include information encrypted with a public key of a toll service provider, information encrypted with the public key of the toll charger cloud, and a public key of the telematics control unit. Responsive to broadcast of the TUM, a toll usage message acknowledgement (TUM-ACK message. A toll receipt message (TRM) is also received. The TRM is encrypted with the public key of the telematics control unit. The TRM is decrypted using a private key of the telematics control unit corresponding to the public key of the telematics control unit.

24 Claims, 16 Drawing Sheets

(56)    References Cited

U.S. PATENT DOCUMENTS

| 2020/0021981 | A1 | 1/2020 | Mondello et al. | |
| 2020/0126124 | A1* | 4/2020 | Inoue | G06Q 30/0266 |
| 2020/0336871 | A1* | 10/2020 | Baek | H04W 28/06 |
| 2020/0364701 | A1* | 11/2020 | Hayakawa | G06Q 20/382 |
| 2022/0198429 | A1* | 6/2022 | Yang | G06Q 20/327 |

\* cited by examiner

SECURE PERSONAL INFORMATION EXCHANGE OVER C-V2X

TECHNICAL FIELD

Aspects of the present disclosure generally relate to the secure exchange of personal information over cellular-vehicle-to-everything (C-V2X) communication.

BACKGROUND

Personal information (PI), or personally identifiable information (PII), is any information relating to an identifiable person. Personal information may also include payment information, such as credit card numbers, account identifiers, vehicle identifiers (such as VIN), vehicle type identifiers, or the like. A toll road is a road for which a fee is assessed for passage. Toll roads are sometimes implemented to help recoup the cost of road construction and maintenance.

SUMMARY

In one or more illustrative examples, a vehicle for securing toll messages is provided. The vehicle includes a telematics control unit configured to provide vehicle-to-everything (V2X) communication, and a processor. The processor is programmed to receive a toll advertisement message (TAM) broadcast from a roadside unit of a roadway via V2X communication, the TAM including a public key of a toll charger cloud, responsive to receipt of the TAM, broadcast a tolling usage message (TUM) via V2X communication, the TUM including information encrypted with a public key of a toll service provider, information encrypted with the public key of the toll charger cloud, and a public key of the telematics control unit, responsive to broadcast of the TUM, receive a toll receipt message (TRM) broadcast from the roadside unit via V2X communication, the TRM being encrypted with the public key of the telematics control unit, and decrypt the TRM using a private key of the telematics control unit corresponding to the public key of the telematics control unit.

In one or more illustrative examples, a system for securing toll messages includes a toll service provider. The toll service provider is programmed to provide a toll service provider public key to a telematic controller of a vehicle, receive a telematic controller public key from the telematic controller, receive a tolling usage message (TUM) from the telematics controller, the TUM including information encrypted with the toll service provider public key and including a telematics controller public key, decrypt the information using a toll service provider private key corresponding to the toll service provider public key, and send a toll receipt message (TRM) to the telematics controller, the TRM including information encrypted using the telematic controller public key, for decryption by the telematics controller using a telematic controller private key corresponding to the telematic controller public key.

In one or more illustrative examples, a method for securing toll messages includes receiving a toll advertisement message (TAM) broadcast from a roadside unit of a roadway via vehicle-to-everything (V2X) communication, the TAM including a public key of a toll charger cloud; responsive to receipt of the TAM, broadcasting a tolling usage message (TUM) via V2X communication, the TUM including information encrypted with a toll service provider public key, information encrypted with the toll charger cloud public key, and a telematics controller public key, the encrypted information including personal information (PI); responsive to broadcast of the TUM, receiving a toll receipt message (TRM) broadcast from the roadside unit via V2X communication, the TRM being encrypted with the public key of the telematics control unit; and decrypting the TRM using a private key of the telematics control unit corresponding to the public key of the telematics control unit.

DETAILED DESCRIPTION

Embodiments of the present disclosure are described herein. It is to be understood, however, that the disclosed embodiments are merely examples and other embodiments can take various and alternative forms. The figures are not necessarily to scale; some features could be exaggerated or minimized to show details of particular components. Therefore, specific structural and functional details disclosed herein are not to be interpreted as limiting, but merely as a representative basis for teaching one skilled in the art to variously employ the embodiments. As those of ordinary skill in the art will understand, various features illustrated and described with reference to any one of the figures can be combined with features illustrated in one or more other figures to produce embodiments that are not explicitly illustrated or described. The combinations of features illustrated provide representative embodiments for typical applications. Various combinations and modifications of the features consistent with the teachings of this disclosure, however, could be desired for particular applications.

During a toll payment transaction or other payments transaction, personal information (PI) may be exchanged with toll authorities over the air. This PI may include, for example, credit card numbers, account details, or vehicle identification numbers.

Approaches may be used to increase the security of transmission of this information over C-V2X. When a message is broadcast, public key encryption may be used to encrypt the information such that an authorized system (having the corresponding private key) can properly decode the information. Using such an approach, exchange of the PI information over the air can be achievable by one or more of: (i) exchange of PI information securely over CV2X-PC5 communication; (ii) exchange of PI information securely over CV2X-PC5 and CV2X-Uu communications; (iii) exchange of PI information securely over CV2X-PC5 and CV2X-Uu communications with different Keys exchange approach over Uu. In another example, (iv) exchange of PI information may be securely performed over CV2X-Uu communication. Each of these possibilities is discussed in further detail herein.

Figure 1A:
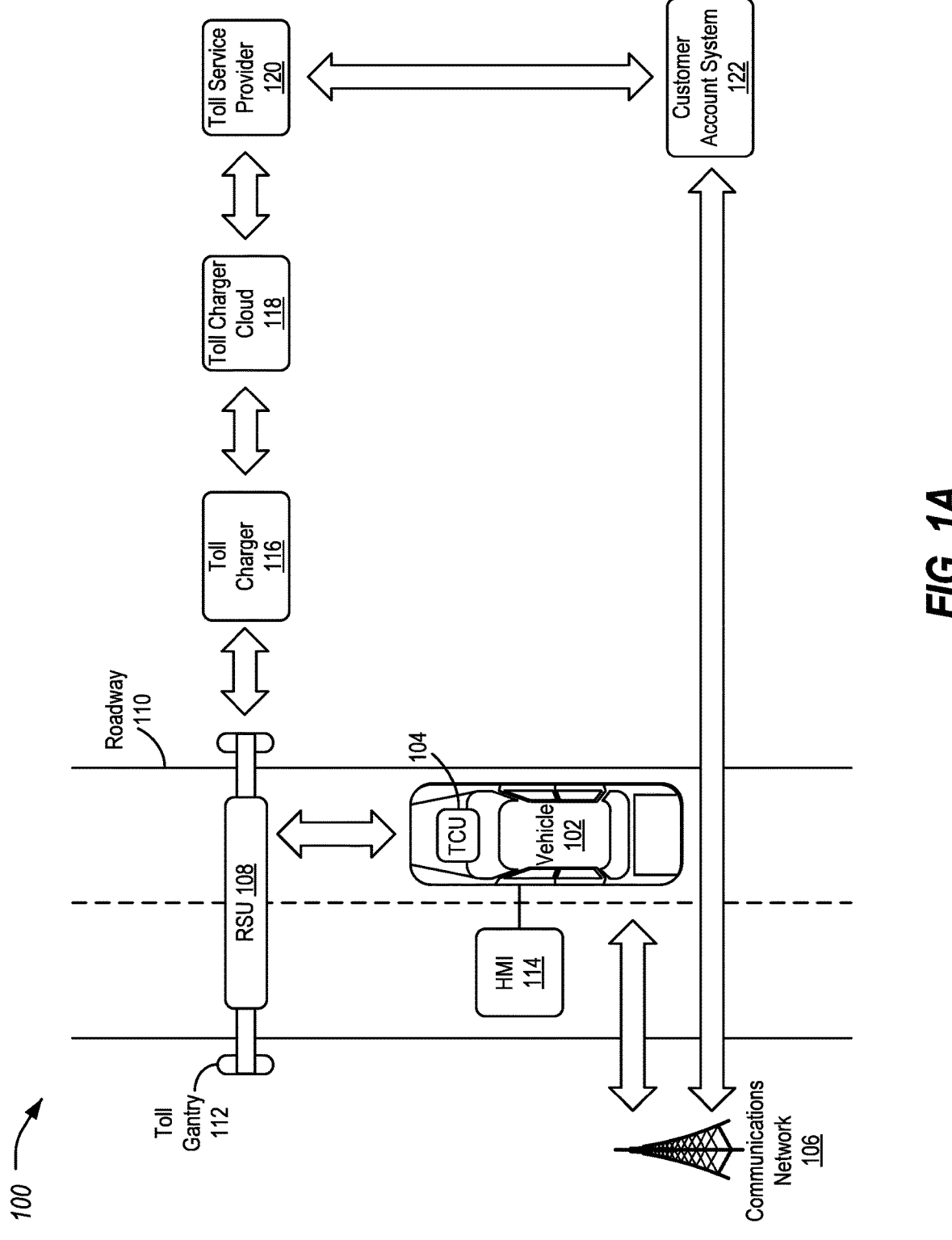
FIG. 1A illustrates an example system for the secure transmission of PI information using C-V2X communication.

FIG. 1 illustrates an example system 100 for the secure transmission of PI information using C-V2X communication. As shown, the system 100 includes a wireless-enabled vehicle 102 configured to travel along a roadway 110. The vehicle 102 includes a telematics control unit (TCU) 104 and an HMI 114. The system 100 also includes a toll gantry 112 or other toll installation that includes a road-side unit (RSU) 108. The RSU 108 communicates with a toll charger 116 over a secure channel (such as a wired connection), which in turn communicates with a toll pay center 118. The toll pay center 118 also communicates with a toll agency hub 120 and a customer account system 122. Using the TCU 104, the vehicle 102 communicates with the RSU 108 over a broadcast peer-to-peer protocol (such as PC5), and with a communications network 106 over a network protocol, which allows the vehicle 102 to communicate with the customer account system 122, for example. It should be noted that the system 100 shown in FIG. 1 is merely an example, and systems having more, fewer, and different arrangements of elements may be used. For instance, one or more of the RSU 108, toll charger 116, toll pay center 118, and toll agency hub 120 may be combined into a single device. Moreover, while only one vehicle 102 along one roadway 110 is shown, it is contemplated that systems 100 would include many vehicles 102 and roadways 110 to traverse.

The vehicles 102 may include various other types of passenger vehicles, such as sedans, crossover utility vehicles (CUVs), vans, sport utility vehicles (SUVs), trucks, recreational vehicles (RVs), scooters, or other mobile machines for transporting people or goods. In many cases, the vehicle 102 may be powered by an internal combustion engine. In such cases, the fuel source may be gasoline or diesel fuel. As another possibility, the vehicle 102 may be a hybrid electric vehicle (HEV) powered by both an internal combustion engine and one or more electric motors, such as a series hybrid electric vehicle (SHEV), a parallel hybrid electric vehicle (PHEV), or a parallel/series hybrid electric vehicle (PSHEV). As yet a further possibility, the vehicle 102 may be an electric vehicle (EV) powered by electric motors without an internal combustion engine. As the type and configuration of vehicles 102 may vary, the capabilities of the vehicles 102 may correspondingly vary. As some other possibilities, vehicles 102 may have different capabilities with respect to passenger capacity, towing ability and capacity, and storage volume. For title, inventory, and other purposes, the vehicle 102 may be associated with a unique identifier, such as a vehicle identification number (VIN).

The TCU 104 may be configured to provide telematics services to the vehicle 102. These services may include, as some non-limiting possibilities, navigation, turn-by-turn directions, vehicle health reports, local business search, accident reporting, and hands-free calling. The TCU 104 may accordingly be configured to communicate over various protocols, such as with a communication network 106 over a network protocol (such as Uu). The TCU 104 may, additionally, be configured to communicate over a broadcast peer-to-peer protocol (such as PC5), to facilitate C-V2X communications with devices such as the RSU 108. It should be noted that these protocols are merely examples, and different peer-to-peer and/or cellular technologies may be used.

The communications network 106 may provide communications services, such as packet-switched network services (e.g., Internet access, voice over Internet Protocol (VoIP) communication services), to devices connected to the communications network 106. An example of a communications network 106 is a cellular telephone network. For instance, the TCU 104 may access the cellular network via connection to one or more cellular towers. To facilitate the communications over the communications network 106, the TCU 104 may be associated with unique device identifiers (e.g., mobile device numbers (MDNs), Internet protocol (IP) addresses, etc.) to identify the communications of the TCU 104 on the communications network 106 as being associated with the vehicle 102.

The RSU 108 may be a device with processing capabilities and networking capabilities, and may be designed to be placed in proximity of a roadway 110 for use in communicating with vehicles 102. In an example, the RSU 108 may include hardware configured to communicate over the broadcast peer-to-peer protocol (such as PC5), to facilitate C-V2X communications with the vehicles 102. The RSU 108 may also have wired or wireless backhaul capability to allow for communication with other elements of the communications network 106, such as the toll charger 116.

The toll gantry 112 may be framework installed across the roadway 110. The toll gantry 112 may serve as a location to mount hardware to give the hardware a clear view of the roadway 110. In an example, the RSU 108 may be mounted to the toll gantry 112. It should be noted that, in other examples, the RSU 108 may be located along the ground adjacent to the roadway 110 and the toll gantry 112 may be omitted.

The HMI 114 may include various output devices configured to provide information to users, as well as input devices configured to receive information from users. Output devices may include, as some examples, display screens, touch screens, projectors, lights, speakers, buzzers, and haptic feedback sensors. Input devices may include, as some examples, touch screens, keyboards, buttons, knobs, and microphones, as some possibilities.

The toll charger 116 is a networked computing device configured to perform operations in support of the functionality of the RSU 108. In an example, the toll charger 116 may be in communication with the RSU 108 and may be programmed to operate as a gateway between the RSU 108 and the toll pay center 118. The toll charger 116 may be responsible for managing operations between the broadcast nature of the RSU 108 operations and the remainder of the system 100. These operations may include, for example, verification of messages received from vehicles 102 by the RSU 108, certificate verification and identification, and communication with the toll pay center 118 to perform further operations over a secure line. In many examples, each RSU 108 may be supported by its own corresponding toll charger 116. However, in other examples, a single toll charger 116 may be configured to handle multiple RSUs 108, such as a set of RSUs 108 covering operation of the roadway 110.

The toll pay center 118 is a networked computing device also configured to perform operations in support of the functionality of the system 100. In an example, the toll pay center 118 may be programmed to perform operations in support of the payment aspects for use of the roadway 110 by the vehicle 102. In some examples, the system 100 may include different toll pay centers 118, where each toll pay center 118 is configured to handle payments for those vehicles 102 having accounts with the toll pay center 118. As one possibility, different vehicle 102 manufacturers may each maintain their own toll pay center 118. As another possibility, vehicles 102 may subscribe to the use of various third-party toll pay centers 118.

The toll agency hub 120 is a networked computing device also configured to perform operations in support of the functionality of the system 100. The toll agency hub 120 may be configured to perform operations such as providing cost information to the various toll pay centers 118 with respect to the costs for usage of the roadway 110. For instance, the toll agency hub 120 may provide a toll schedule indicative of the costs of traversing the roadway 110, including costs for usage of different lanes (e.g., express, carpool, regular, etc.), usage for different classes of vehicles 102 (e.g., passenger cars, semi-trucks, etc.), usage for different times of day, and usage for high traffic vs low traffic situations. The toll agency hub 120 may also be configured to perform payment reconciliation operations, reporting functions, and may also provide information regarding vehicles 102 that are observed on the roadway 110 that may not have paid (e.g., as identified according to wireless transmissions of basic safety messages (BSMs), pictures from cameras, etc.).

The customer account system 122 is a networked computing device also configured to perform operations in support of the functionality of the system 100. Using the customer account system 122 a user may set up a payment account, be charged by the toll charger 116 for use of the roadway 110, and request and receive toll receipts with respect to usage of the roadway 110. Such payment transactions require the exchange of PI with toll authorities over the air.

Figure 1B:
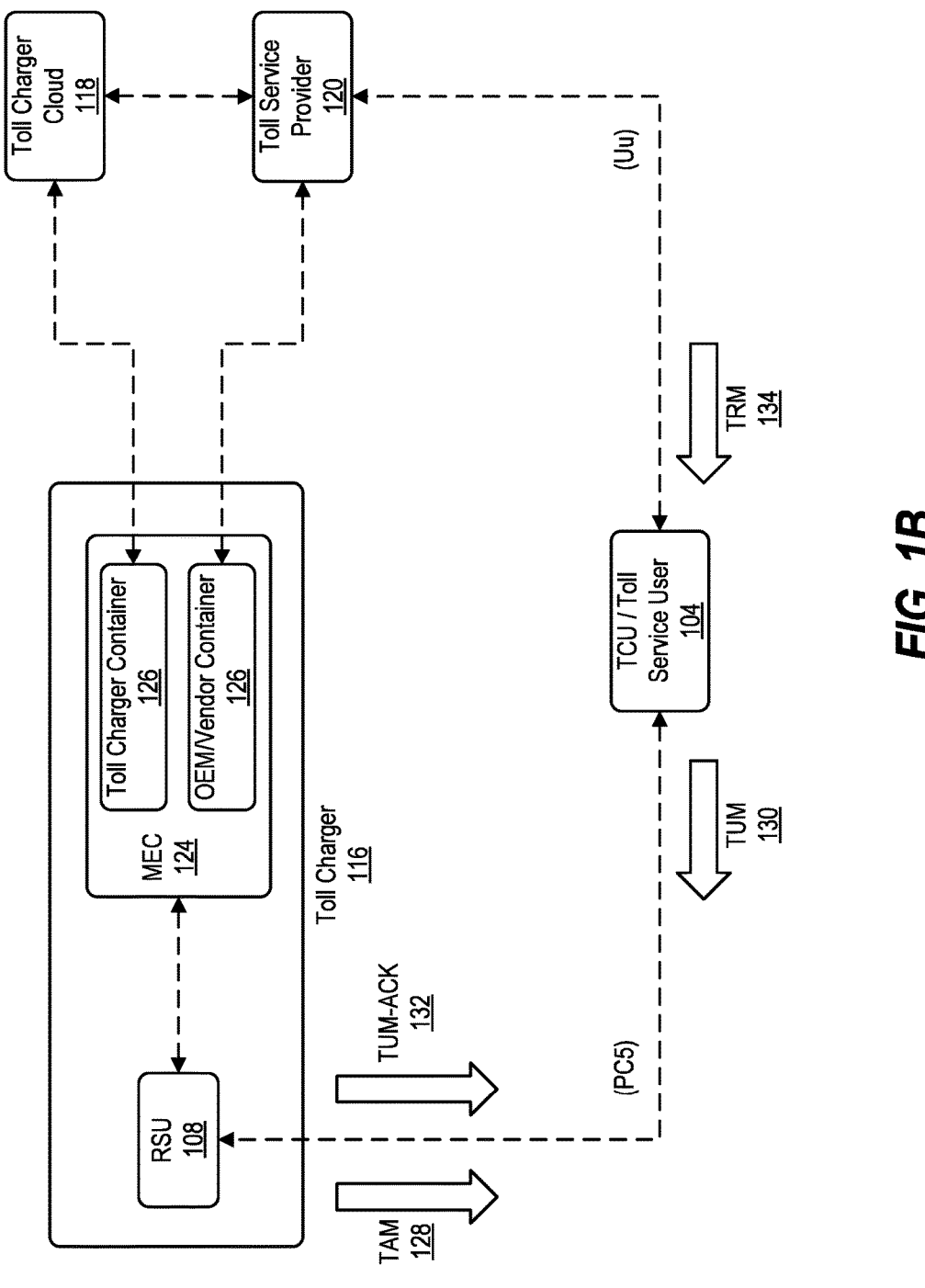
FIG. 1B illustrates further aspects of the example system for the secure transmission of PI information using C-V2X communication.

FIG. 1B illustrates further aspects of the example system 100 for the secure transmission of PI information using C-V2X communication. Referring to FIG. 1B, the TCU 104 is an example of a toll service user. However, more broadly speaking, the toll service user of the system 100 is a customer of a toll service provider 120, e.g., the party liable for a toll. This party may be an owner of the vehicle 102, a fleet operator, or a driver of the vehicle 102 depending on context.

With respect to the toll charger 116 infrastructure, the toll charger 116 infrastructure may refer to aspects of the system 100 that are local to the toll service user. This may include, as shown, the RSU 108, as well as a Multi Access Edge Computing (MEC) 124 device. The toll charger 116 infrastructure may use access technology that enables localized communications between the toll service user and the RSU 108 (and/or MEC 124) to collect charging data local to the tool service user.

The toll charger cloud 118, as mentioned above, is configured to levy tolls for vehicle 102 usage in a toll domain. The toll service provider 120, as mentioned above, is configured to provide toll services in one or more toll domains. As shown, the MEC 124 includes toll charger containers 126 for different toll domains. These toll charger domains may be implemented as containers, such as docket containers in an example, to provide for quick use and separation from other computing resources.

V2X Tolling may refer to electronic fee collection (EFC) toll charging supported by electronic equipment on-board of a vehicle 102 configured for V2X communication. As discussed in further detail herein, these V2X communications may include the exchange of information between the infrastructure elements outlined herein. The exchange of information between the toll service user and the RSU 108 over PC5 or the toll service user and the toll service provider 120 over Uu may include a toll advertisement message (TAM) 128, a toll usage message (TUM) 130, a TUM acknowledgement (TUM-ACK) 132, and a toll receipt message (TUM) 134. Generally, the TAM may include an advertisement of tolling information (e.g., tolling geometry and respective charges for respective vehicle 102 types at respective times). The TUM 130 may include usage information of the vehicle 102 used for charging the vehicle 102. The TUM 130 may include an identifier of the vehicle 102, which in turn may be used by the MEC 124 to determine the correct toll charger domain. (It should be noted that the system 100 may include multiple toll service provider cloud systems, where the different systems correspond with OEMs or vendors of toll services.) The TUM-ACK 132 may acknowledge that TUM 130 has been received. The TRM 134 may include information regarding a receipt for usage of the resources being charged for.

Figure 2:
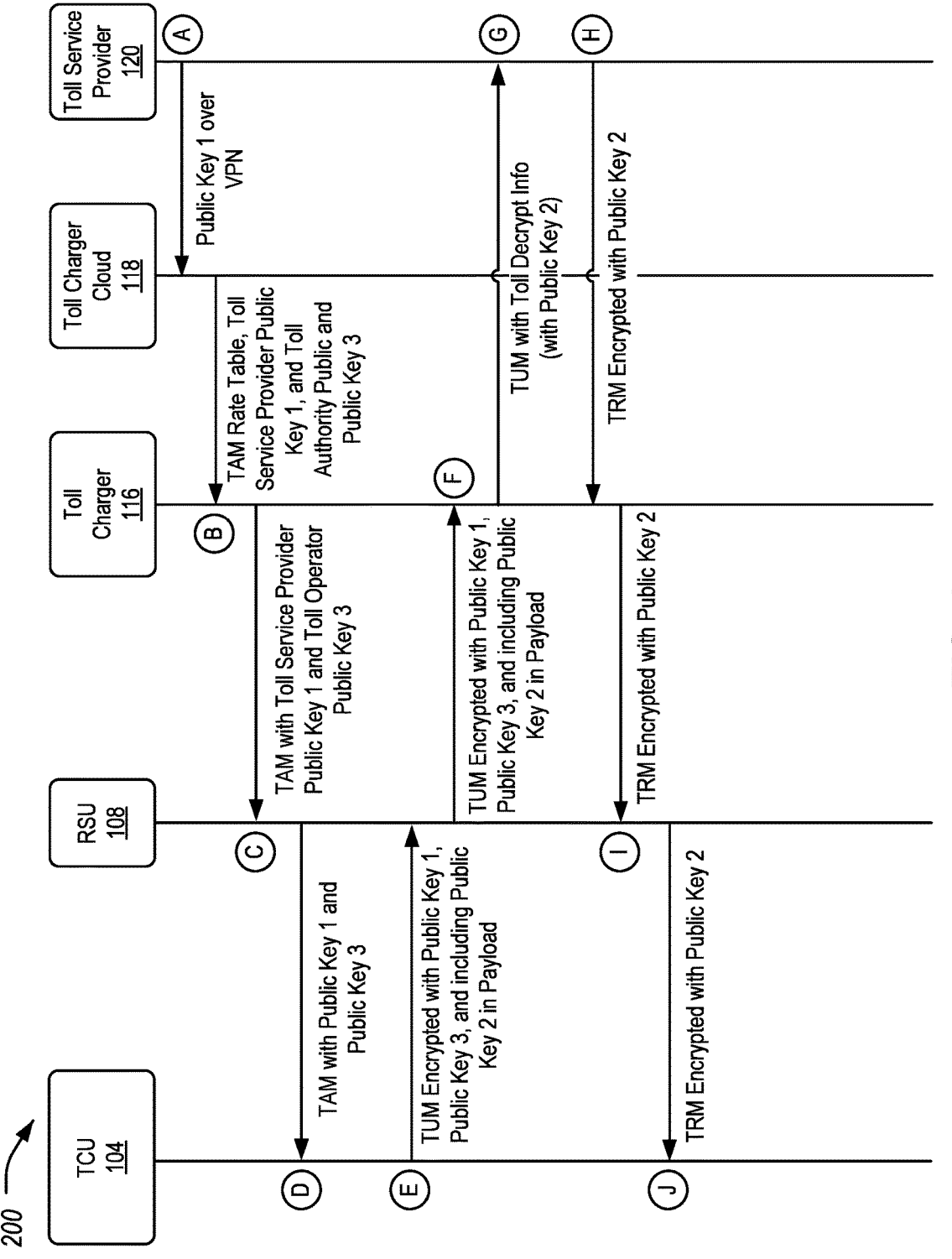
FIG. 2 illustrates an example dataflow for the secure provisioning of tolling transactions over the air.

FIG. 2 illustrates an example dataflow 200 for the secure provisioning of tolling transactions over the air. At the outset, the toll service provider 120, toll charger cloud 118, and TCU 104 may generate public keys and corresponding private keys to be used in a tolling payment transaction. Using the terminology discussed herein, a public/private key pair 1 is generated by the toll service provider 120 operating as the backend, a public/private key pair 2 is generated by the TCU 104 operating as the toll service user, and a public/private key pair 3 is generated by the toll charger cloud 118 acting as intermediary between the TCU 104 and toll service provider 120 in the performance of the toll payment transaction.

At index (A), the toll service provider 120 shares the public key 1 generated by the toll service provider 120 with the toll charger cloud 118. At index (B), the toll charger cloud 118 shares the public key 1 with the toll charger 116, along with the public key 3 generated by the toll charger cloud 118 and a rate table. This toll rate table may include information that may be used to allow a vehicle 102 to understand the charges that may be incurred to traverse the roadway 110. In a simple example, the toll rate schedule may indicate that the cost to traverse the roadway 110 is a fixed amount. However, in many examples, the cost to traverse the roadway 110 may vary according to various factors. For instance, travel in a first lane may incur a first charge, while travel in another lane may incur a second, different, charge. In another example, the cost may vary based on the number of occupants of the vehicle 102. In yet a further example, the cost may vary based on the type of vehicle 102 (e.g., a semitruck may incur a greater charge than a passenger car). In an even further example, costs may vary based on other factors, such as amount of traffic, time of day, day of week, and/or weather.

Figures 3A, 3B:
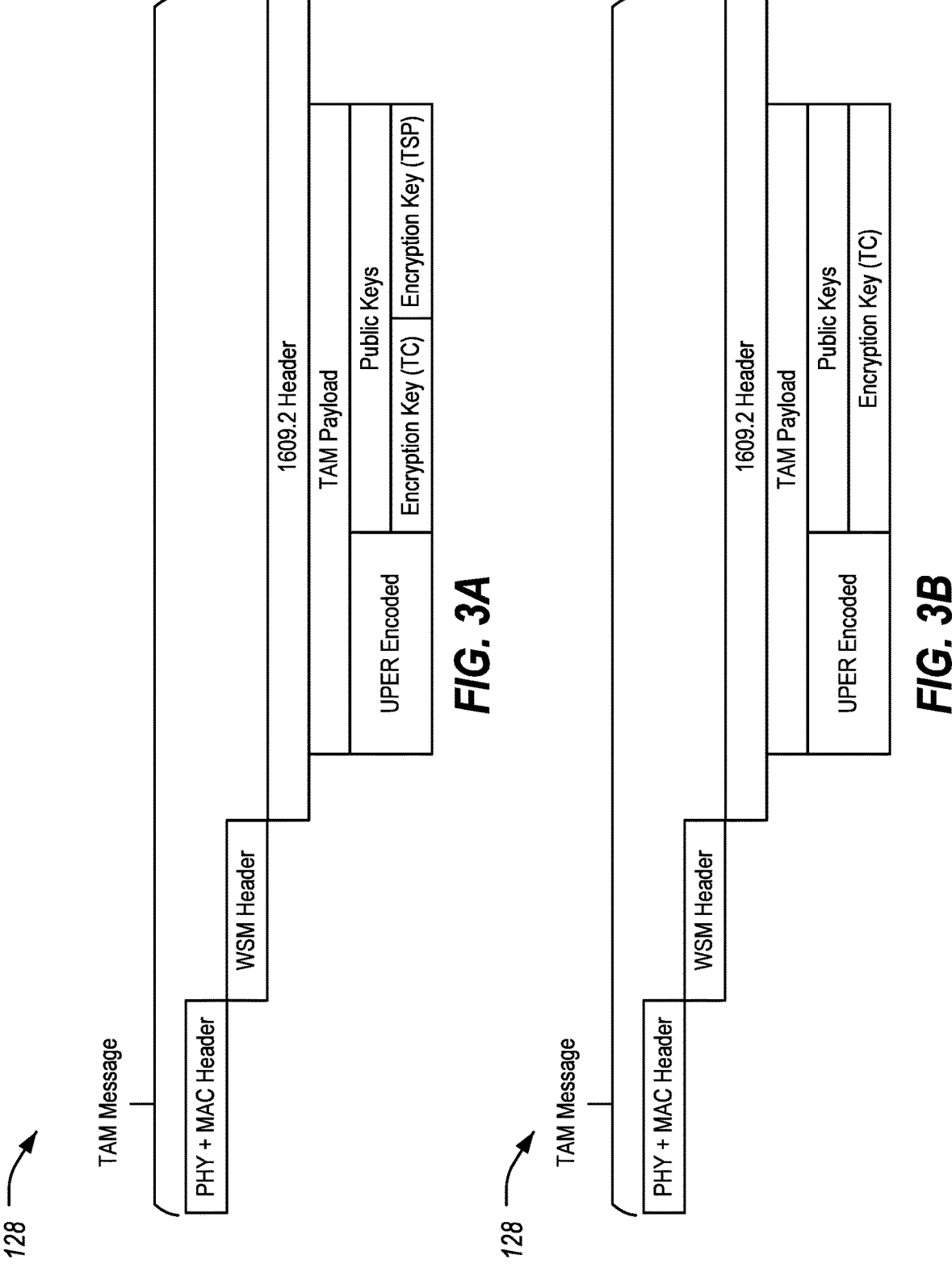
FIGS. 3A-3E illustrates example toll advertisement message structures.

At index (C), and with further reference to the example TAM 128 structure shown in FIG. 3A, the toll charger cloud 118 forwards the two public keys 1 and 3 (the toll charger public key and toll service provider public key) to the RSU 108 along with a TAM 128 for further broadcast over PC5. The TAM 128 generally includes information such as toll road geometry for various types or topologies of tolling, a tariff table for use in determining toll cost, vehicle types and occupant information, and time and distance types information. As shown in FIG. 3A, the TAM 128 includes header information, such as physical layer and media access control (MAC) header information and Wave Short Message (WSM) protocol header information. The TAM 128 further includes header information in accordance with the IEEE 1609.2 messaging protocols, into which the TAM 128 payload is placed. The TAM 128 payload includes information, e.g., encoded in an unaligned packet encoding rules (UPER) encoding. This information, however, may not be further encrypted using one of the keys described herein. The encoded information may include for example, the two public keys 1 and 3 (the toll charger public key and toll service provider public key) as shown.

With continuing reference to FIG. 2, at index (D) the TCU 104 user of the toll service receives the TAM 128 broadcast over PC5. At index (E), and with further reference to the example TUM 130 structure of FIG. 4A, responsive to receipt of the TAM 128, the TCU 104 generates an encrypted TUM 130 using the public keys broadcast in the TAM 128 as received by the RSU 108. This TUM 130 is broadcast over PC5 to be received by the RSU 108.

Figure 4A:
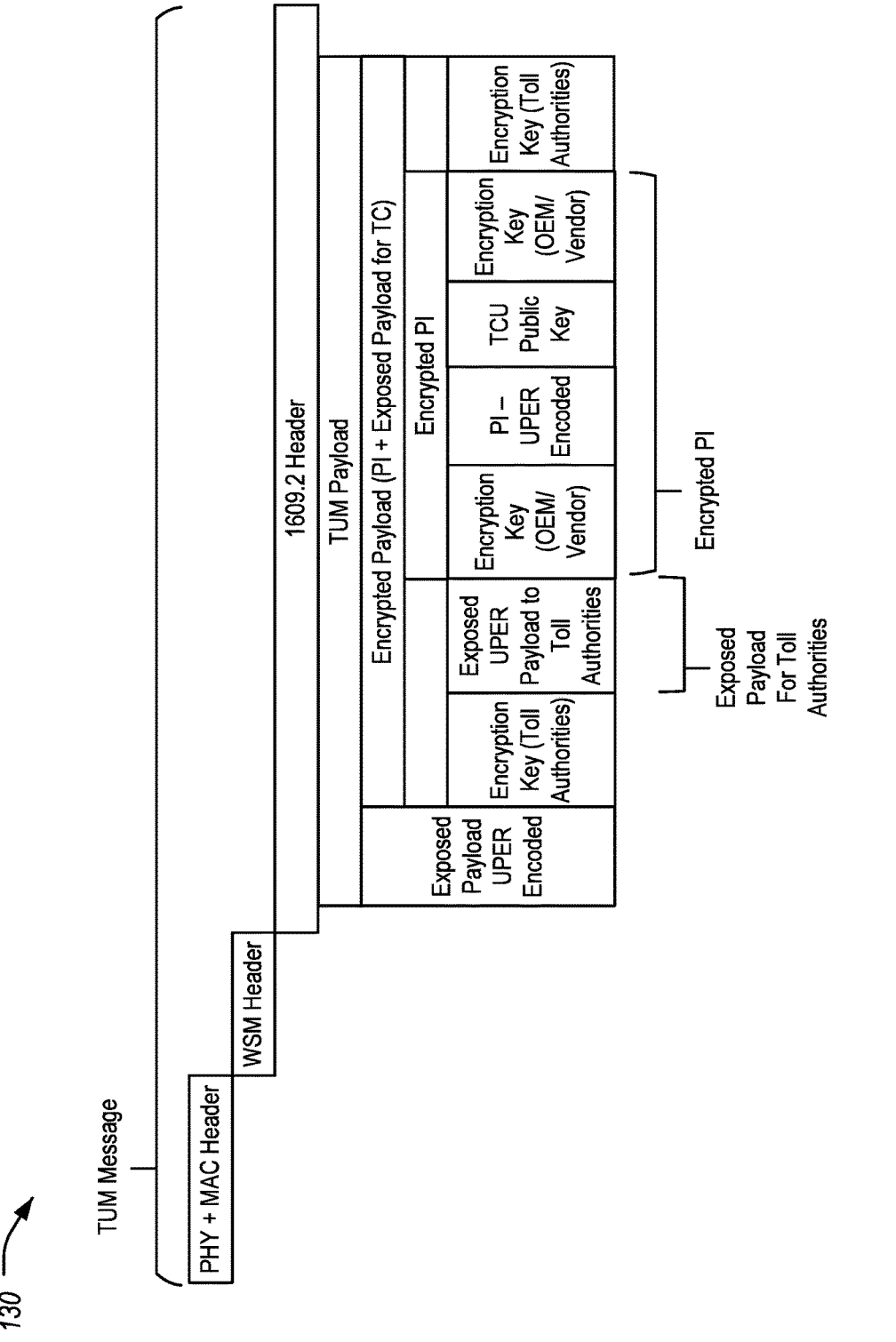
FIG. 4A-4B illustrates example toll usage message structures in a broadcast communication mode.

The TUM 130 generally includes PI information and other information from the toll service user for use by the toll service provider 120. This information may include, for instance, information for the toll charger 116 infrastructure, information for the toll charger cloud 118, and information for the toll service provider 120. As shown in FIG. 4A, the TUM 130 includes header information, such as physical layer and media access control (MAC) header information and Wave Short Message (WSM) protocol header information. The TUM 130 further includes header information in accordance with the IEEE 1609.2 messaging protocols, into which the TUM 130 payload is placed. Significantly, the TUM 130 contains information with respect to the toll service user encrypted using the toll charger public key 3 and also encrypted personal information (PI) of the user encrypted using the public key 1 of the toll service provider 120. The TUM 130 also contains the public key 2 generated by the TCU 104 along with the payload of the TUM 130.

With continuing reference to FIG. 2, at index (F), the RSU 108 forwards the received TUM 130 to the toll charger 116. The toll charger 116 decrypts the toll authority information from the TUM 130 (using the private key 3) and also forwards the TUM 130 via the toll charger cloud 118 to the toll service provider 120 through a secure connection (e.g., a virtual private network (VPN)). At index (G), the toll service provider 120 decrypts the PI (e.g., credit card information, other payment information, etc.).

Figure 5A:
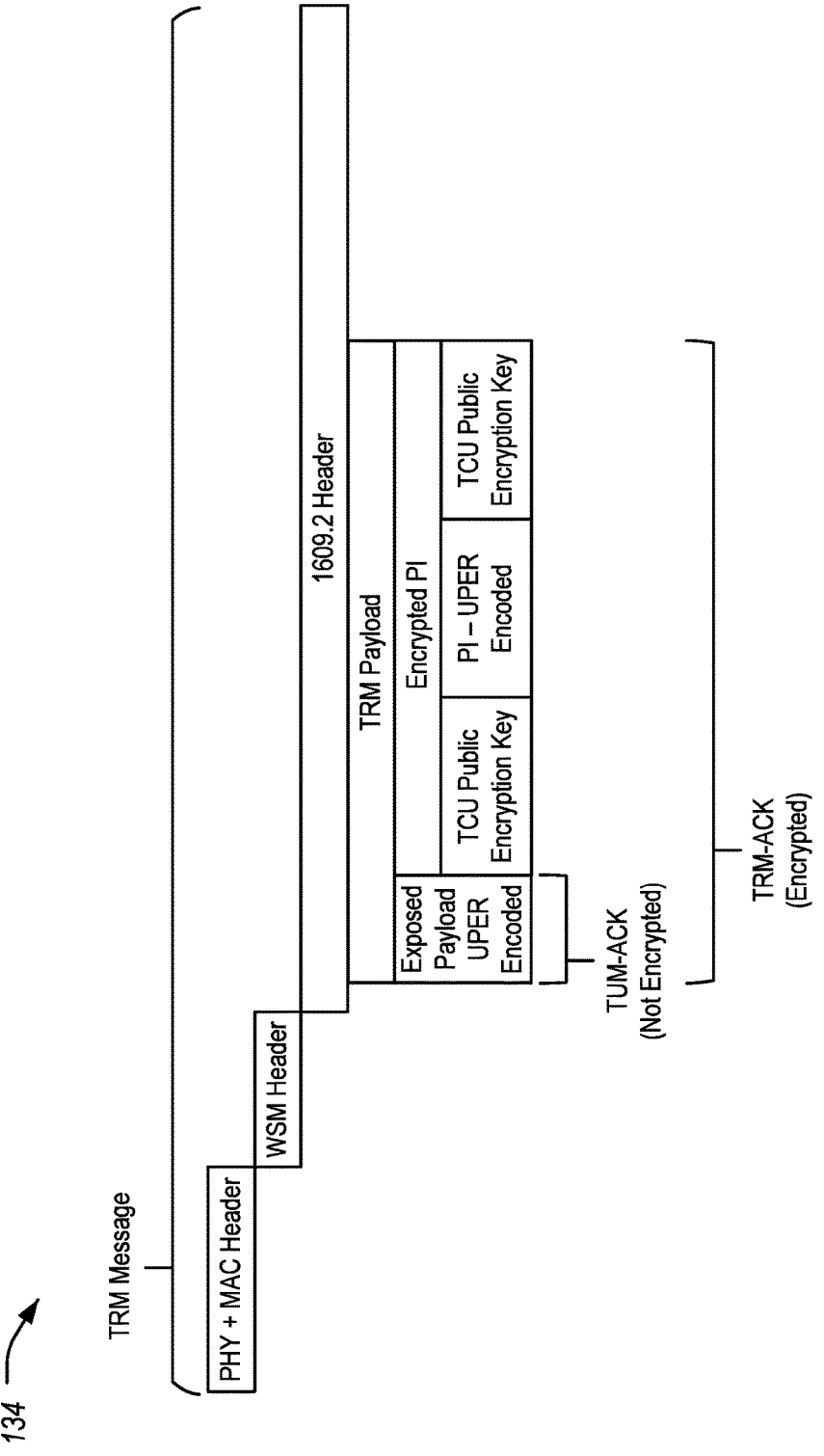
FIG. 5A illustrates an example toll response message structure in a broadcast communication mode.
Figure 5B:
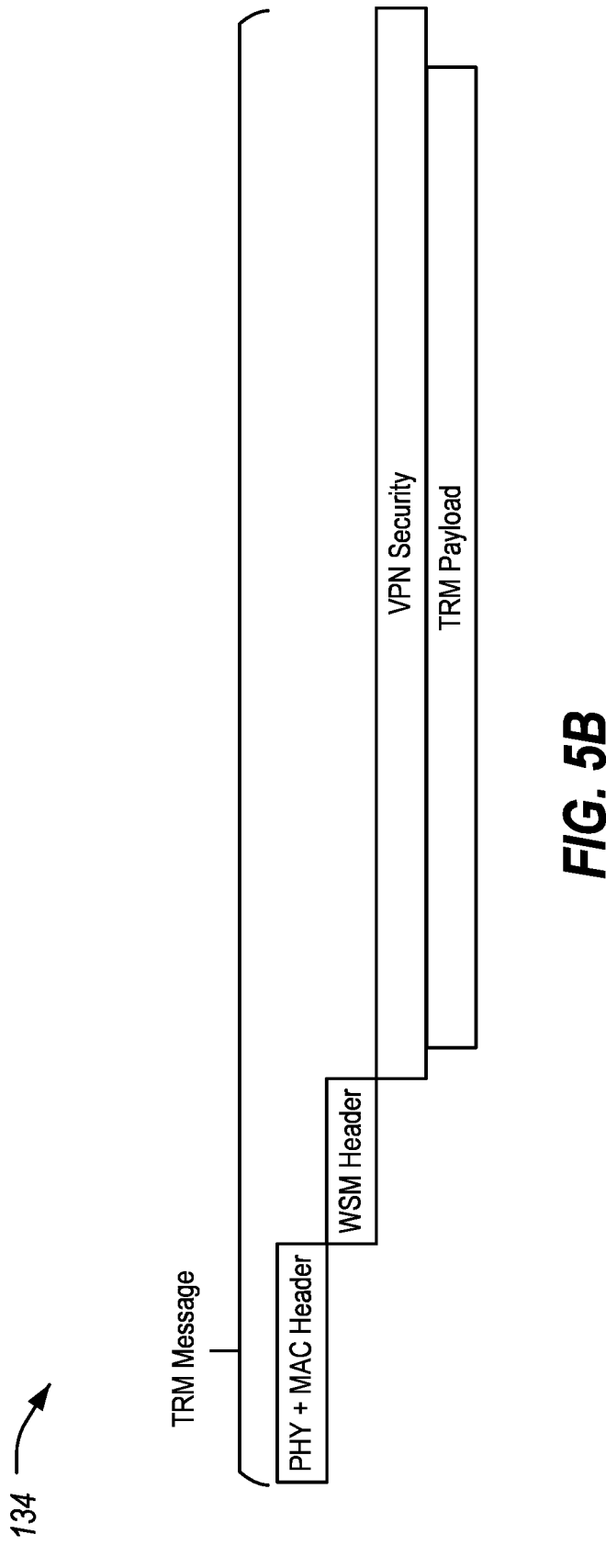
FIG. 5B illustrates an example toll response message structure in a cellular communication mode.
Figure 5C:
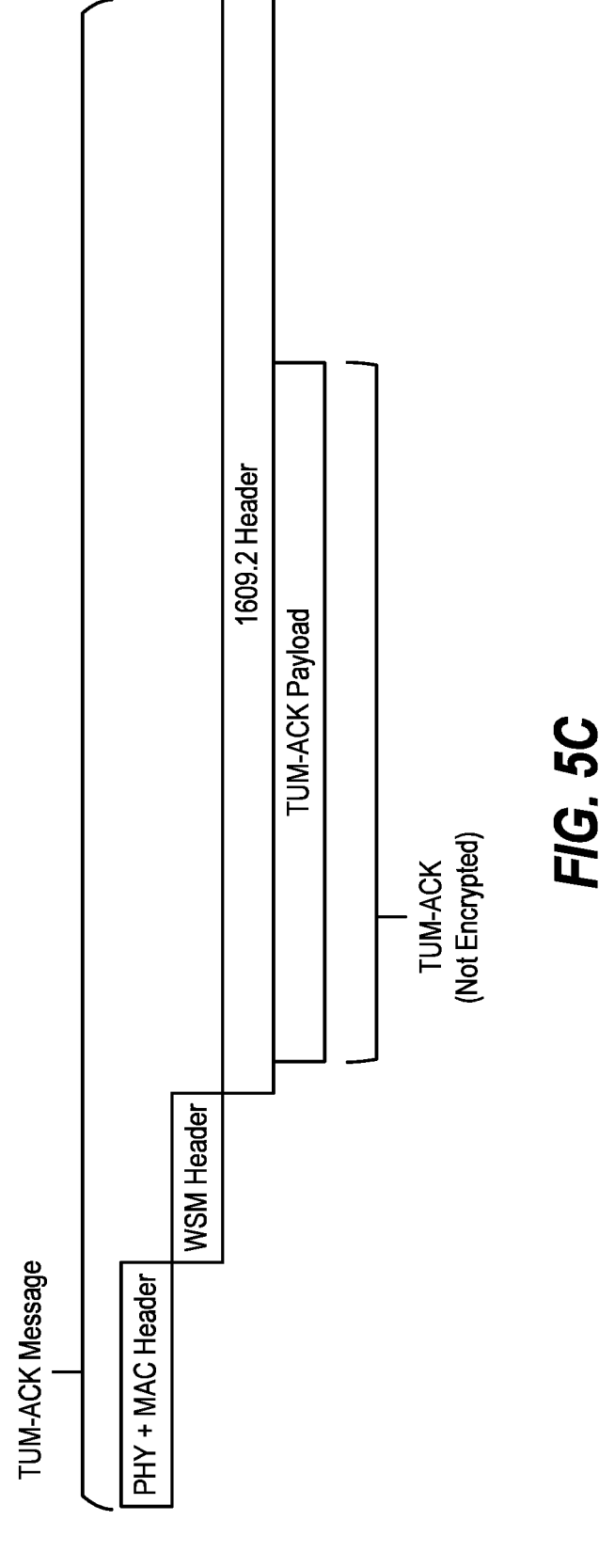
FIG. 5C illustrates an example toll usage message acknowledgment message structure.

At index (H), the toll service provider 120 generate a TRM 134 and forwards the generated TRM 134 to toll charger 116 over a secure connection (for example again a VPN). As shown in FIG. 5A, the TRM 134 includes header information, such as physical layer and media access control (MAC) header information and Wave Short Message (WSM) protocol header information. The TRM 134 further includes header information in accordance with the IEEE 1609.2 messaging protocols, into which the TRM 134 payload is placed. This information may include, for example, an acknowledgement to the TUM 130, which may be encoded (e.g., UPER encoded), but not encrypted using the public keys 1, 2, or 3. A TUM-ACK example is shown in FIG. 5C. The TRM 134 is encrypted using the public key 2 having been previously generated by the toll service user (in this example the TCU 104) and shared with the toll service provider 120 in the payload of the TUM 130.

With continuing reference to FIG. 2, at index (I), the RSU 108 broadcasts the received TRM 134 over PC5. At index (J), this broadcast TRM 134 may be received by the TCU 104. The TCU 104, having the private key 2 (corresponding to the public key 2 which was sent in the TUM 130) decrypts the TRM 134 and, for example, display a toll receipt on the HMI 114 of the vehicle 102. It should be noted that while this TRM 134 is broadcast, other toll service users are unable to decrypt this TRM 134 because they lack the correct private key 2.

Figure 6:
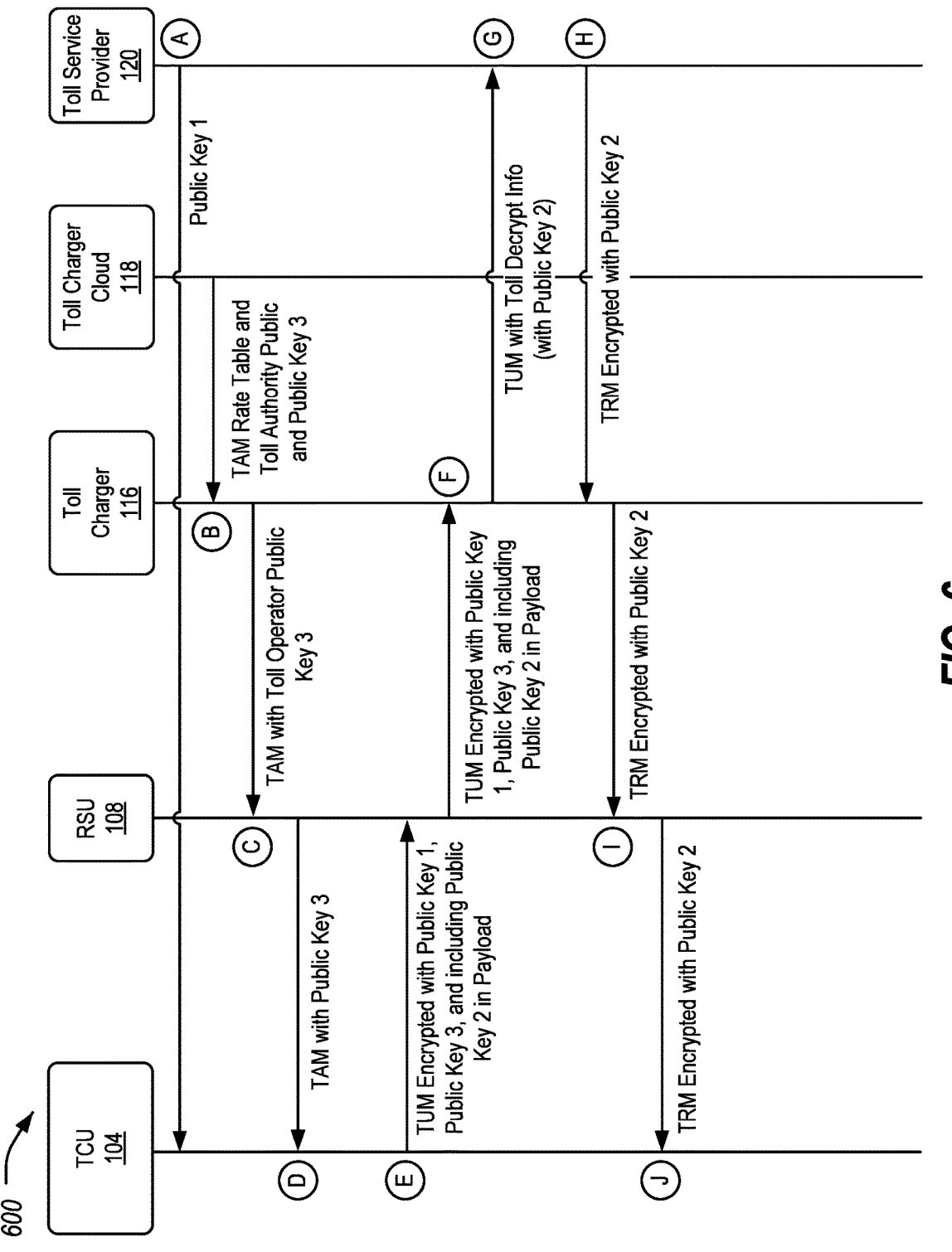
FIG. 6 illustrates an alternate example dataflow for the secure provisioning of payment transactions over the air.

FIG. 6 illustrates an alternate example dataflow 600 for the secure provisioning of payment transactions over the air. Similar to the dataflow 200, a public/private key pair 1 is generated by the toll service provider 120 operating as the backend, a public/private key pair 2 is generated by the TCU 104 operating as the toll service user, and a public/private key pair 3 is generated by the toll charger cloud 118 acting as intermediary between the TCU 104 and toll service provider 120 in the performance of the toll payment transaction.

At index (A), the toll service provider 120 again shares the public key 1 generated by the toll service provider 120; however, this is done to the TCU 104 acting as toll service user over a secured VPN connection such as for example cellular Uu interface. (It should be noted that while Uu in used in examples herein, other interfaces may be used such as Wi-Fi.) At index (B), the toll charger cloud 118 shares the public key 3 and a rate table with the toll charger 116, but not the public key 1 as the toll charger cloud 118 does not receive the public key 1 from the toll service provider 120.

At index (C), the toll charger cloud 118 forwards the public key 3 (the toll charger public key) to the RSU 108 along with a TAM 128 for further broadcast over PC5. An example is shown in FIG. 3B. It should be noted that, in this example, the TAM 128 includes only the public key 3 but not the public key 1. At index (D) the TCU 104 user of the toll service receives the TAM 128 over PC5.

Figure 4B:
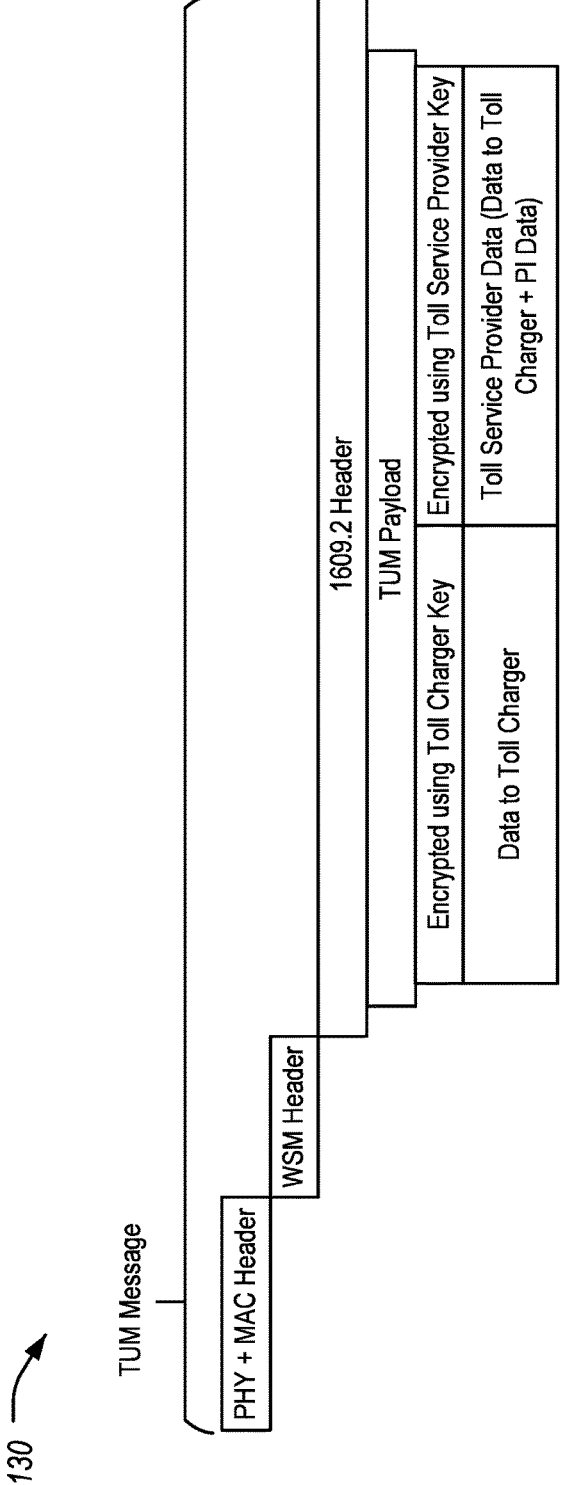

At index (E), the TCU 104 generates an encrypted TUM 130 using the public key 3 broadcast in the TAM 128 as received from the RSU 108 and also using the public key 1 received, e.g., over cellular from the toll service provider 120. An example is shown in FIG. 4B. This TUM 130 also includes the public key 2 of the TCU 104 in the payload.

At index (F), the RSU 108 forwards the received TUM 130 to the toll charger 116. The toll charger 116 decrypts the toll authority information from the TUM 130 (using the private key 3) and also forwards the TUM 130 along with the public key 2 in the payload to the toll service provider 120 through a secure connection (e.g., a VPN). At index (G), the toll service provider 120 decrypts the PI (e.g., credit card information, other payment information, etc.) using the private key 1.

At index (H) the toll service provider 120 generates a TRM 134 and sends the generated TRM 134 to the toll charger 116 over a secure connection (for example again a VPN). The toll charger 116 may forward the TRM 134 to the RSU 108.

At index (I), the RSU 108 broadcasts the received TRM 134 over PC5. At index (J), this broadcast TRM 134 may be received by the TCU 104. The TCU 104, having the private key 2 (corresponding to the public key 2 which was sent during the TUM 130) decrypts the TRM 134 and, for example, display a toll receipt on the HMI 114 of the vehicle 102. It should be noted that, as with the example dataflow 200, in the example dataflow 600 while this TRM 134 is broadcast, other toll service users are unable to decrypt this TRM 134 because they lack the correct private key 2.

Figure 7:
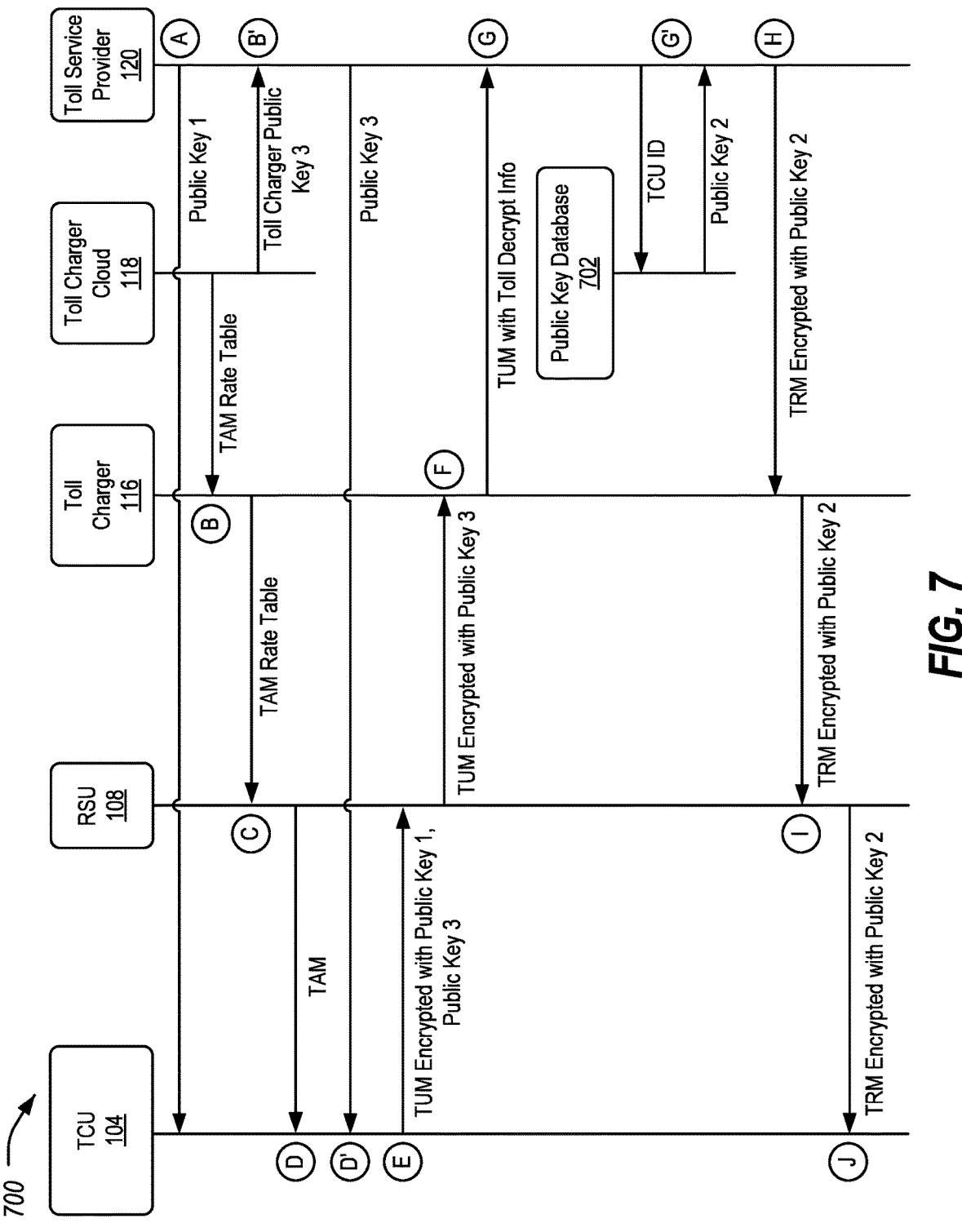
FIG. 7 illustrates a further alternate example dataflow for the secure provisioning of tolling transactions over the air.

FIG. 7 illustrates a further alternate example dataflow 700 for the secure provisioning of tolling transactions over the air. Similar to the dataflows 200 and 600, a public/private key pair 1 is generated by the toll service provider 120 operating as the backend, a public/private key pair 2 is generated by the TCU 104 operating as the toll service user, and a public/private key pair 3 is generated by the toll charger cloud 118 acting as intermediary between the TCU 104 and toll service provider 120 in the performance of the toll payment transaction. However, in the dataflow 200 and dataflow 600, the PC5 message size is increased by including public keys in messages. With the approach of the dataflow 700, the PC5 message size is reduced by avoiding the public key exchange over PC5.

At index (A), the toll service provider 120 shares the public key 1 generated by the toll service provider 120. As with the dataflow 600, this may be sent by the toll service provider 120 to the TCU 104 (acting as toll service user) over a secured VPN connection over cellular such as over Uu. At index (B), the toll charger cloud 118 shares a rate table with the toll charger 116, but not the public keys as the toll charger cloud 118 does not receive the public keys from the toll service provider 120. At index (B'), the toll charger cloud 118 also forwards the public key 3 (the toll charger public key) to the toll service provider 120, e.g., via secured VPN connection.

Figures 3C, 3D:
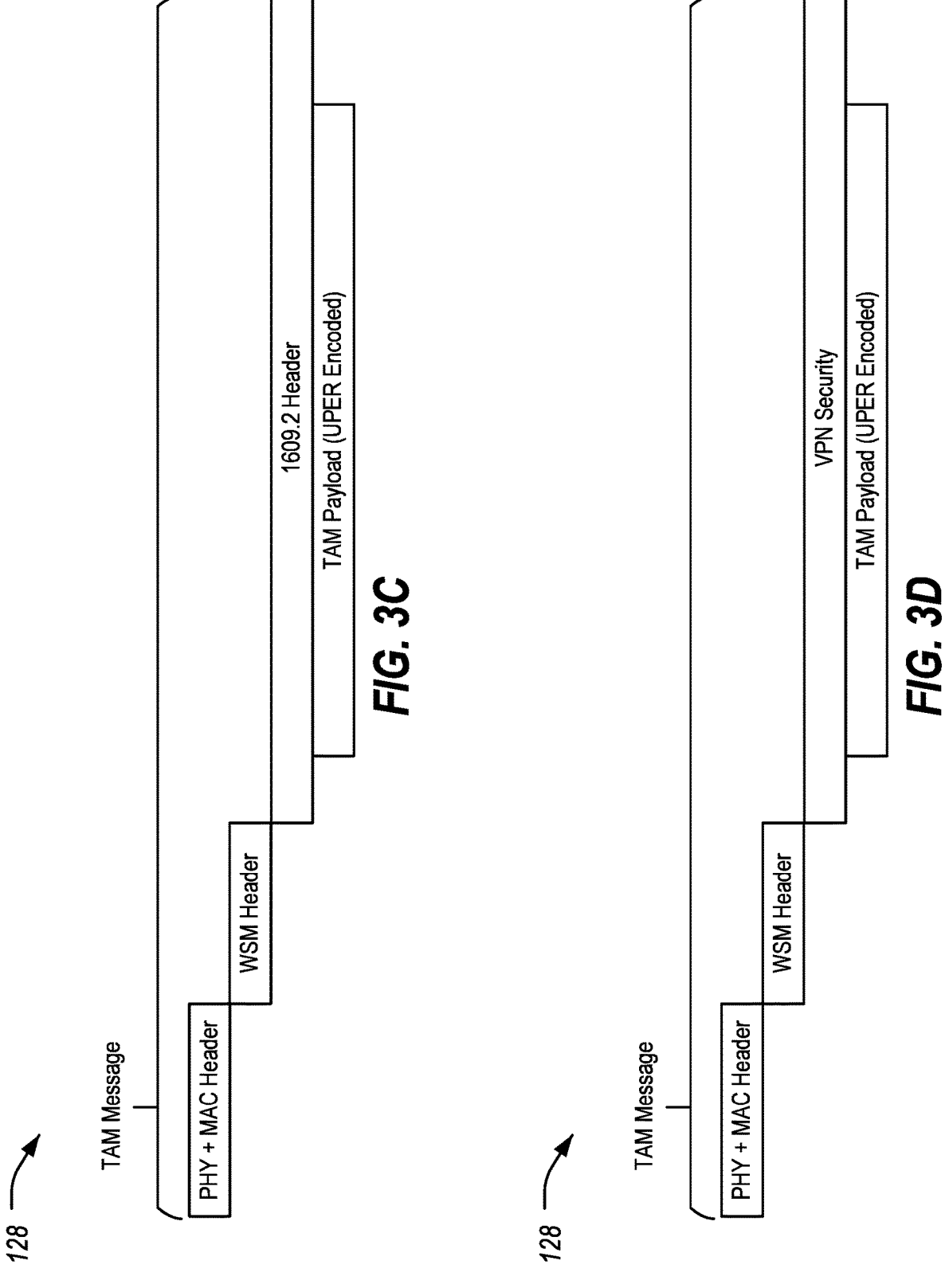
Figure 3E:
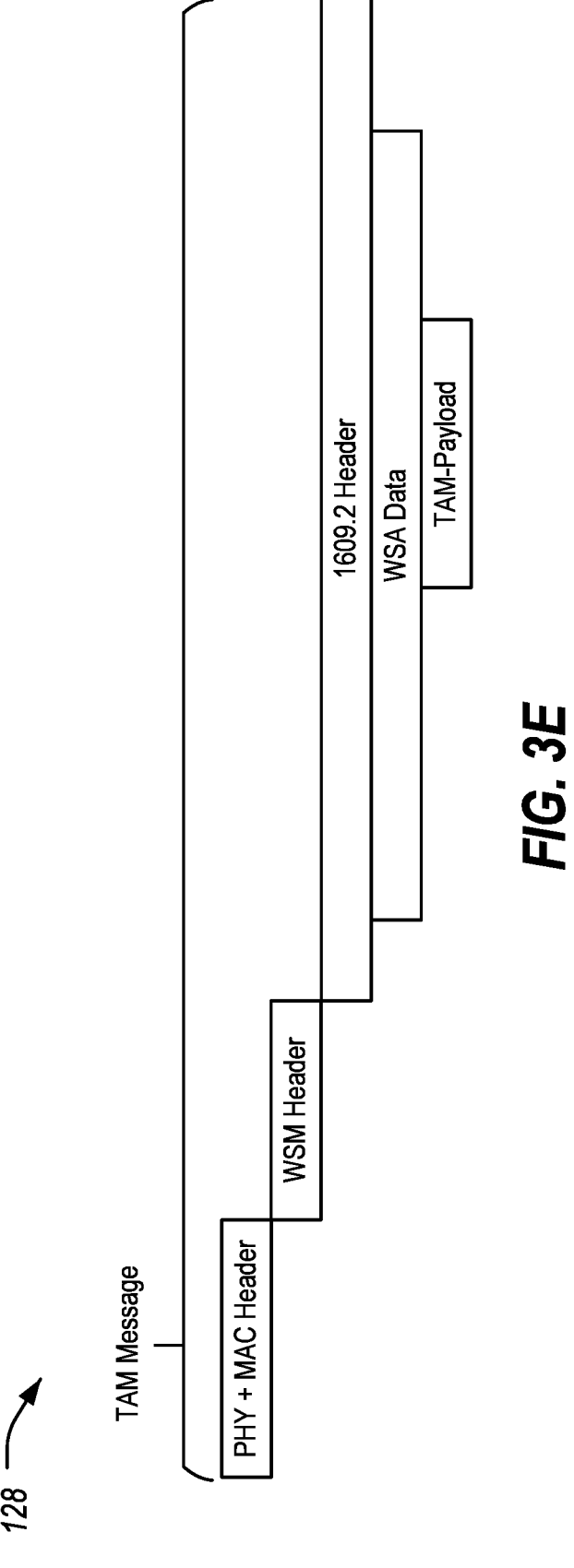

At index (C), the toll charger cloud 118 the TAM 128 for further broadcast over PC5. It should be noted that, in this example, the TAM 128 includes no keys. An example of such a TAM 128 is shown in FIG. 3C. At index (D), the TCU 104 user of the toll service receives the TAM 128 over PC5. To allow the TCU 104 to have the public key 3, at index (D') the TCU 104 receives the public key 3 from the toll service provider 120 via secured VPN connection, e.g., over cellular such as over Uu. It should be noted that (D') could precede (D) and/or (C), (B), and (A). The toll service provider 120 may, for example, detect the TCU 104 approaching the RSU 108 and pre-emptively send the public key 3 to the TCU 104 over a secured VPN connection such as a cellular connection or a Uu interface.

At index (E), the TCU 104 generates an encrypted TUM 130 using the public key 3 and the public key 1 received over cellular from the toll service provider 120. Notably, this TUM 130 does not include the public key 2 of the TCU 104 in the payload. Thus TUM 130 is broadcast by the TCU 104, and received by the RSU 108. An example is shown in FIG. 4B.

At index (F), the RSU 108 forwards the received TUM 130 to the toll charger 116. The toll charger 116 decrypts the toll authority information from the TUM 130 (using the private key 3) and also forwards the TUM 130 to the toll service provider 120 through a secure connection (e.g., a VPN). At index (G), the toll service provider 120 decrypts the PI (e.g., credit card information, other payment information, etc.) using the private key 1.

Significantly, as the public key 2 is not included in the TUM 130, at index (G') the toll service provider 120 queries a public key data 702 to gain access to the public key 2. For instance, the toll service provider 120 may retrieve an identifier of the TCU 104 from the TUM 130, and may sent that identifier to the public key database 702 to receive the public key 2 corresponding to the TCU 104 in response. To allow for this to occur, in an example, each TCU 104 is mapped with its public keys 2 during an enrollment process with the public key data 702 (or another entity that indirectly provides the identifier and key information to the public key data 702) based on the identifier of the TCU 104.

At index (H) the toll service provider 120 generates a TRM 134 and sends the generated TRM 134 to the toll charger 116 over a secure connection (for example again a VPN). The toll charger 116 forwards the TRM 134 to the RSU 108.

At index (I), the RSU 108 broadcasts the received TRM 134 over PC5. At index (J), this broadcast TRM 134 is received by the TCU 104. The TCU 104, having the private key 2 (corresponding to the public key 2 in the public key database 702) decrypts the TRM 134 and, for example, display a toll receipt on the HMI 114 of the vehicle 102. It should be noted that, as with the example dataflow 200, in the example dataflow 700 while this TRM 134 is broadcast, other toll service users are unable to decrypt this TRM 134 because they lack the correct private key 2.

Figure 8:
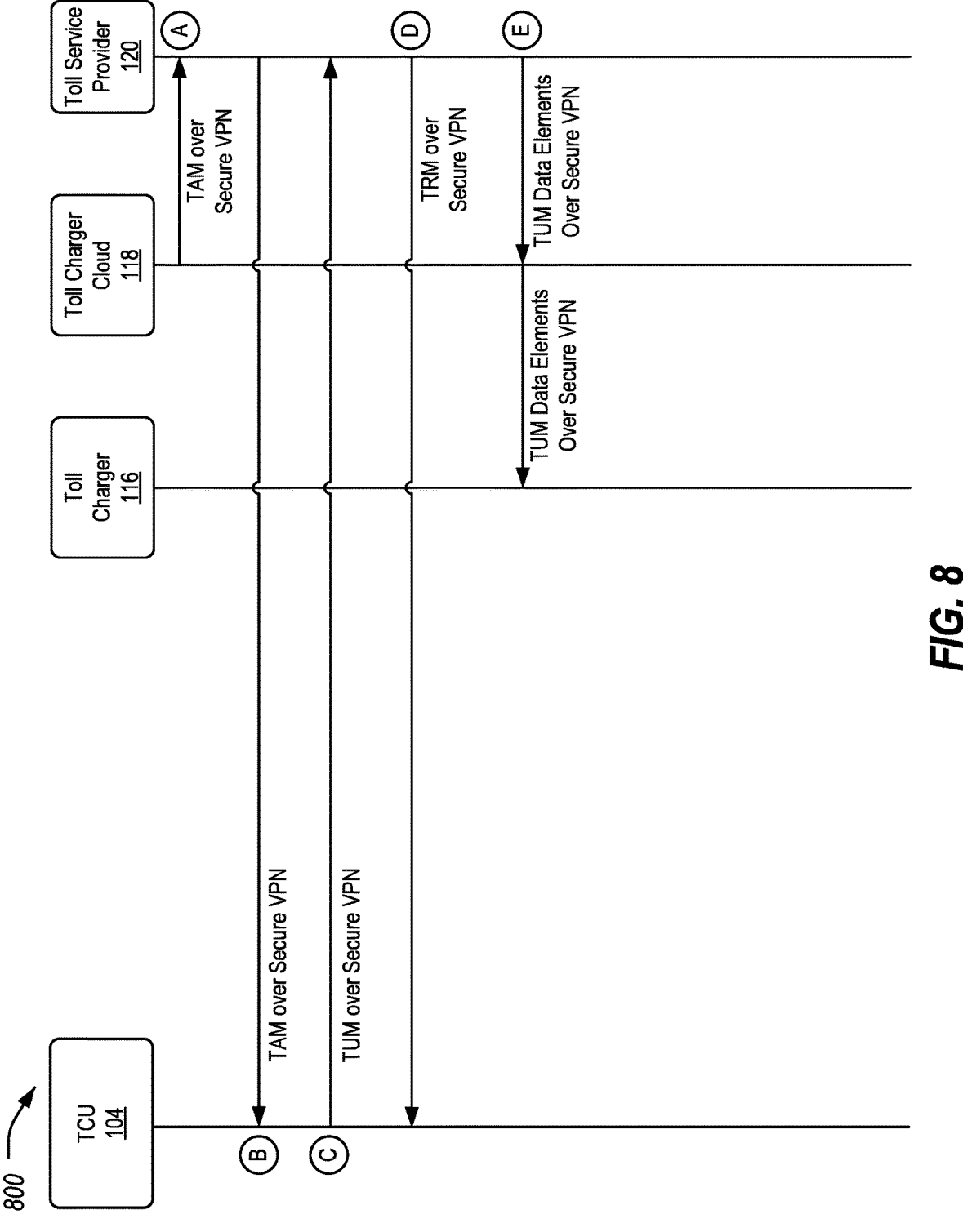
FIG. 8 illustrates yet another alternate example dataflow for the secure provisioning of tolling transactions over the air.

FIG. 8 illustrates yet another alternate example dataflow 800 for the secure provisioning of tolling transactions over the air. In the example dataflow 800, as compared to the dataflows 200, 600 and 700 that were previously explained, the tolling communications takes place over secure VPN between the toll service user TCU 104, the toll service provider 120, the toll charger 116, and the toll charger cloud 118. By using this approach, the overhead for exchange of the keys within the TAM 128, TUM 130, and TRM 134, or may be avoided.

At index (A), the TAM 128 is generated by the toll charger cloud 118 and shared with the toll service provider 120 securely. With reference to FIG. 3D, as shown in the alternate example, a TAM 128 for use over a cellular interface such as Uu is illustrated. As shown, as compared to the TAM 128 of FIG. 3C for use in broadcast, the TAM 128 for cellular use includes a payload secured via VPN, without the additional inclusion of keys or other specifically-encoded data. With continued reference to FIG. 8, at index (B), the toll service provider 120 forwards the TAM 128 to the TCU 104. This may be done, in an example, upon request of the TCU 104. Or, this may be done, in another example, where the toll service provider 120 pushes the TAM 128 to the TCU 104 without the TCU 104 explicitly requesting it.

Figure 4C:
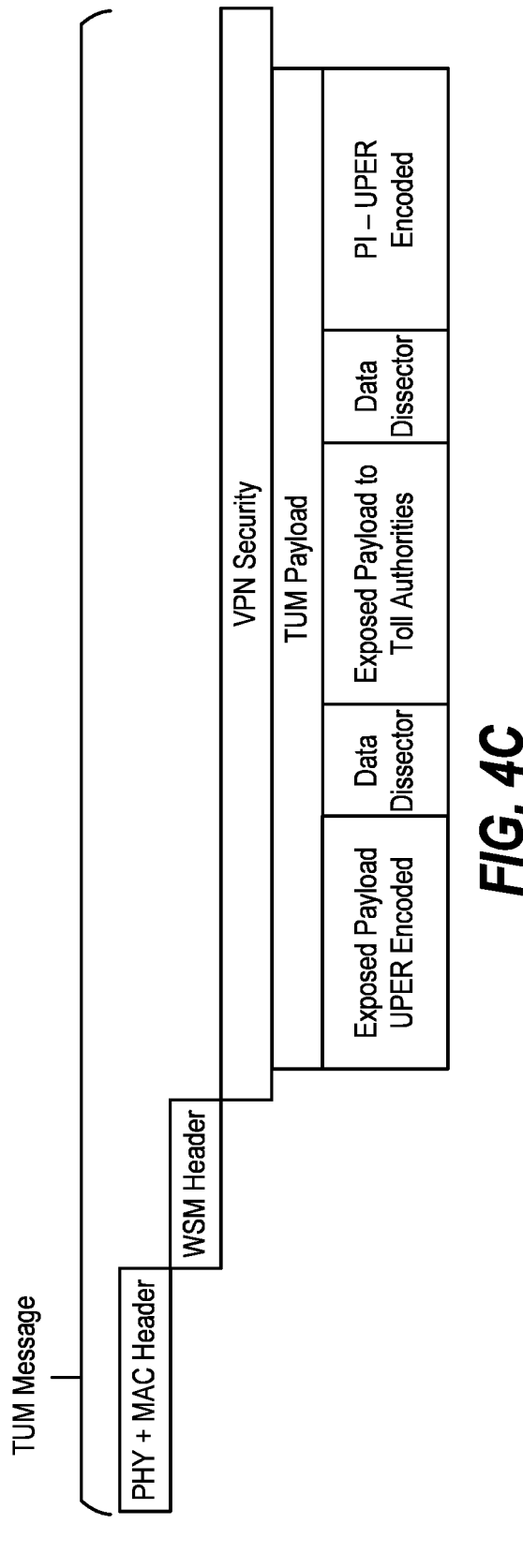
FIG. 4C illustrates an example toll usage message structure in a cellular communication mode.

At index (C), responsive to receiving the TAM 128, the TCU 104 generates the TUM 130 and sends to the toll service provider 120. This generation of the TUM 130 may be based on a triggering threshold. With reference to FIG. 4C, as shown in the alternate example, a TUM 130 for use over a cellular interface such as Uu is illustrated. As shown, as compared to the TUM 130 of FIG. 4A for use in broadcast, the TAM 128 for cellular use includes a payload secured via VPN, without the additional inclusion of keys. However, to facilitate the processing of the included data elements, in an example the payload and PI elements may be separated by data dissectors which may be used to easily reference the locations of the different included elements.

With continued reference to FIG. 8, at index (D), the toll service provider 120, upon reception of TUM 130, generates the TRM 134 and sends the TRM 134 back to the TCU 104. With reference to FIG. 5B, as shown in the alternate example, a TRM 134 for use over a cellular interface such as Uu is illustrated. As shown, as compared to the TRM 134 of FIG. 5A for use in broadcast, the TRM 134 for cellular use includes a payload secured via VPN, without the additional inclusion of keys.

With continued reference to FIG. 8, at index (E), the toll service provider 120 also shares data element of the TUM 130 from the TCU 104 to the toll charger 116 to perform the payment transaction. In an example, this communication may be performed through the toll charger cloud 118. Responsive to receipt of the TUM 130 data, the toll charger 116 verifies the TCU 104 is detected, e.g., via sensors of the toll gantry 112. Having detected the TCU 104, the toll transaction may be completed for the TCU 104.

Figure 9:
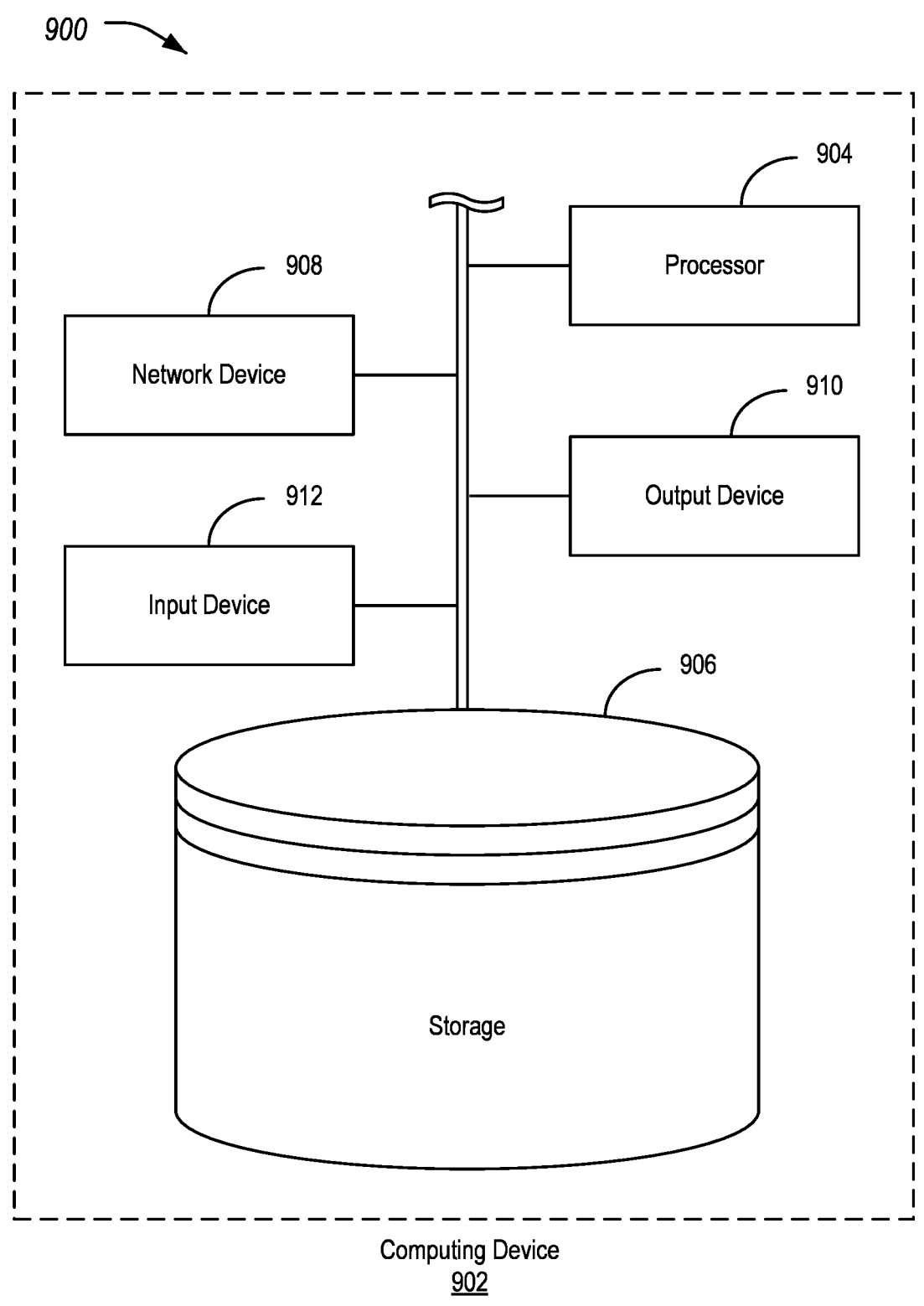
FIG. 9 illustrates an example of a computing device for use in the secure transmission of PI information using C-V2X communication.

FIG. 9 illustrates an example 900 of a computing device 902 for use in the secure transmission of PI information using C-V2X communication. Referring to FIG. 9, and with reference to FIGS. 1-8, the TCU 104, RSU 108, toll charger 116, toll pay center 118, and customer account system 122 are examples of such computing devices 902. As shown, the computing device 902 may include a processor 904 that is operatively connected to a storage 906, a network device 908, an output device 910, and an input device 912. It should be noted that this is merely an example, and computing devices 902 with more, fewer, or different components may be used.

The processor 904 may include one or more integrated circuits that implement the functionality of a central processing unit (CPU) and/or graphics processing unit (GPU). In some examples, the processors 904 are a system on a chip (SoC) that integrates the functionality of the CPU and GPU. The SoC may optionally include other components such as, for example, the storage 906 and the network device 908 into a single integrated device. In other examples, the CPU and GPU are connected to each other via a peripheral connection device such as PCI express or another suitable peripheral data connection. In one example, the CPU is a commercially available central processing device that implements an instruction set such as one of the x86, ARM, Power, or MIPS instruction set families.

Regardless of the specifics, during operation the processor 904 executes stored program instructions that are retrieved from the storage 906. The stored program instructions, accordingly, include software that controls the operation of the processors 904 to perform the operations described herein. The storage 906 may include both non-volatile memory and volatile memory devices. The non-volatile memory includes solid-state memories, such as NAND flash memory, magnetic and optical storage media, or any other suitable data storage device that retains data when the system is deactivated or loses electrical power. The volatile memory includes static and dynamic random-access memory (RAM) that stores program instructions and data during operation of the system 100.

The GPU may include hardware and software for display of at least two-dimensional (2D) and optionally three-dimensional (3D) graphics to the output device 910. The output device 910 may include a graphical or visual display device, such as an electronic display screen, projector, printer, or any other suitable device that reproduces a graphical display. As another example, the output device 910 may include an audio device, such as a loudspeaker or headphone. As yet a further example, the output device 910 may include a tactile device, such as a mechanically raiseable device that may, in an example, be configured to display braille or another physical output that may be touched to provide information to a user.

The input device 912 may include any of various devices that enable the computing device 902 to receive control input from users. Examples of suitable input devices that receive human interface inputs may include keyboards, mice, trackballs, touchscreens, voice input devices, graphics tablets, and the like.

The network devices 908 may each include any of various devices that enable the TCU 104, RSU 108, toll charger 116, toll pay center 118, toll agency hub 120, and customer account system 122 to send and/or receive data from external devices over networks (such as the communications network 106). Examples of suitable network devices 908 include an Ethernet interface, a Wi-Fi transceiver, a cellular transceiver, or a BLUETOOTH or BLUETOOTH Low Energy (BLE) transceiver, or other network adapter or peripheral interconnection device that receives data from another computer or external data storage device, which can be useful for receiving large sets of data in an efficient manner.

While exemplary embodiments are described above, it is not intended that these embodiments describe all possible forms encompassed by the claims. The words used in the specification are words of description rather than limitation, and it is understood that various changes can be made without departing from the spirit and scope of the disclosure. As previously described, the features of various embodiments can be combined to form further embodiments of the invention that may not be explicitly described or illustrated. While various embodiments could have been described as providing advantages or being preferred over other embodiments or prior art implementations with respect to one or more desired characteristics, those of ordinary skill in the art recognize that one or more features or characteristics can be compromised to achieve desired overall system attributes, which depend on the specific application and implementation. These attributes can include, but are not limited to cost, strength, durability, life cycle cost, marketability, appearance, packaging, size, serviceability, weight, manufacturability, ease of assembly, etc. As such, to the extent any embodiments are described as less desirable than other embodiments or prior art implementations with respect to one or more characteristics, these embodiments are not outside the scope of the disclosure and can be desirable for particular applications.

What is claimed is:

1. A vehicle for securing toll messages, comprising:
a telematics control unit (TCU) comprising one or more hardware computing devices, the TCU operating as a toll service user, the toll service user being a customer of a toll service provider, the customer being liable for a toll; and
a processor, programmed to:
receive a toll advertisement message (TAM) broadcast from a roadside unit of a roadway via vehicle-to-everything (V2X) communication, the TAM including a public key of a toll charger cloud;
responsive to receipt of the TAM, broadcast a tolling usage message (TUM) via V2X communication, the TUM including personal information (PI) of the toll service user encrypted with a public key of the toll service provider, other information than the PI with respect to the toll service user encrypted with the public key of the toll charger cloud, and a public key of the telematics control unit, the PI including account information of the customer to pay the toll, the account information of the PI being secured by the encryption using the public key of the toll service provider;
responsive to broadcast of the TUM, receive a toll receipt message (TRM) broadcast from the roadside unit via V2X communication, the TRM being encrypted with the public key of the telematics control unit; and decrypt the TRM using a private key of the telematics control unit corresponding to the public key of the telematics control unit.

2. The vehicle of claim 1, wherein the personal information (PI) includes information of an occupant of the vehicle.

3. The vehicle of claim 1, wherein the processor is further programmed to, responsive to broadcast of the TUM, receive a Toll Usage Message Acknowledgment (TUM-ACK) from the roadside unit via V2X communication as confirmation of the TUM.

4. The vehicle of claim 1, wherein the TAM further includes the public key of the toll service provider.

5. The vehicle of claim 1, wherein the processor is programmed to receive the public key of the toll service provider from the toll service provider over a cellular connection separate from receipt of the TAM.

6. The vehicle of claim 1, wherein the processor is further programmed to generate the private key of the telematics control unit and the public key of the telematics control unit.

7. The vehicle of claim 1, wherein the TRM indicates a final cost charged to the vehicle for access to the roadway; and wherein the processor is further programmed to indicate, to a user interface of the vehicle, the final cost.

8. The vehicle of claim 1, wherein the public key of the toll service provider and the public key of the toll charger cloud are encoded in the TAM using unaligned packet encoding rules (UPER).

9. A system for securing toll messages, comprising:

a toll service provider, programmed to:

provide a toll service provider public key to a telematics controller of a vehicle;

receive a telematics controller public key from the telematics controller operating as a toll service user, the toll service user being a customer of the toll service provider, the customer being liable for a toll;

receive a tolling usage message (TUM) from the telematics controller, the TUM including personal information (PI) of the toll service user encrypted with the toll service provider public key and including the telematics controller public key, the PI including account information of the customer to pay the toll, the account information of the PI being secured by the encryption using the toll service provider public key;

decrypt the personal information (PI) of the toll service user using a toll service provider private key corresponding to the toll service provider public key; and send a toll receipt message (TRM) to the telematics controller, the TRM including information encrypted using the telematics controller public key, the telematics controller being configured to decrypt the information encrypted using the telematics controller public key using a telematics controller private key corresponding to the telematics controller public key.

10. The system of claim 9, wherein the personal information (PI) includes information of an occupant of the vehicle.

11. The system of claim 9, wherein the toll service provider is further programmed to, responsive to receipt of the TUM, send a Toll Usage Message Acknowledgment (TUM-ACK) as confirmation of the TUM.

12. The system of claim 9, wherein the toll service provider public key is provided to the telematics controller of a vehicle over a cellular connection.

13. The system of claim 9, wherein the toll service provider public key is provided to the telematics controller of the vehicle in a toll advertisement message (TAM).

14. The system of claim 9, wherein communications performed by the toll service provider are sent and/or received over virtual private network (VPN) connections.

15. The system of claim 9, further comprising:

a toll charger programmed to:

send a toll advertisement message (TAM) to a roadside unit of a roadway to be broadcast via V2X communication to the telematics controller of the vehicle, the TAM including a toll charger cloud public key;

receive the tolling usage message (TUM) from the roadside unit, the TUM including other information than the PI with respect to the toll service user encoded using the toll charger cloud public key;

decrypt the other information of the toll service user using a toll charger cloud private key corresponding to the toll charger cloud public key; and forward the TUM to the toll service provider.

16. The system of claim 15, further comprising:

the telematics controller, programmed to:

receive the toll advertisement message (TAM), broadcast from the roadside unit of the roadway via V2X communication, the TAM including the toll charger cloud public key;

responsive to receipt of the TAM, broadcast the tolling usage message (TUM) via V2X communication, the TUM including personal information (PI) of the toll service user encrypted with the toll service provider public key, other information than the PI with respect to the toll service user encrypted with the toll charger cloud public key, and the telematics controller public key;

responsive to broadcast of the TUM, receive the toll receipt message (TRM) broadcast from the roadside unit via V2X communication, the TRM being encrypted with the telematics controller public key; and decrypt the TRM using a telematics controller private key corresponding to the telematics controller public key.

17. The system of claim 9, further comprising:

a toll charger programmed to share a toll charger cloud public key with the toll service provider over a cellular connection, wherein the toll service provider is further programmed to share the toll charger cloud public key with the telematics controller for use in encryption of toll charger data in the TUM.

18. A method for securing toll messages comprising:

receiving, by a telematics controller operating as a toll service user, the toll service user being a customer of a toll service provider, the customer being liable for a toll, a toll advertisement message (TAM) broadcast from a roadside unit of a roadway via vehicle-to-everything (V2X) communication, the TAM including a toll charger cloud public key;

responsive to receipt of the TAM, broadcasting, from the telematics controller, a tolling usage message (TUM) via V2X communication, the TUM including personal information (PI) of the toll service user encrypted with a toll service provider public key, other information than the PI with respect to the toll service user encrypted with the toll charger cloud public key, and a telematics controller public key, the encrypted information including personal information (PI), the PI including account information of the customer to pay the toll, the account information of the PI being secured by the encryption using the toll service provider public key;

responsive to broadcast of the TUM, receiving, by the telematics controller, a toll receipt message (TRM) broadcast from the roadside unit via V2X communication, the TRM being encrypted with the telematics controller public key; and decrypting, by the telematics controller, the TRM using a telematics controller private key corresponding to the telematics controller public key.

19. The method of claim 18, wherein the TAM further includes the toll service provider public key.

20. The method of claim 18, further comprising responsive to broadcast of the TUM, receiving a Toll Usage Message Acknowledgment (TUM-ACK) from the roadside unit via V2X communication as confirmation of the TUM.

21. The method of claim 18, further comprising receiving the toll service provider public key from the toll service provider over a cellular connection separate from receipt of the TAM.

22. The method of claim 18, further comprising generating, by the telematics controller, the telematics controller private key and the telematics controller public key.

23. The method of claim 18, wherein the TRM indicates a final cost charged to a vehicle for access to the roadway; and further comprising indicating, to a user interface of the vehicle, the final cost.

24. The method of claim 18, wherein the toll service provider public key and the toll charger cloud public key are encoded in the TAM using unaligned packet encoding rules (UPER).

* * * * *